United States Patent
Malatak

(10) Patent No.: US 12,281,271 B2
(45) Date of Patent: Apr. 22, 2025

(54) PRODUCTION OF RENEWABLE FUELS AND INTERMEDIATES

(71) Applicant: VALERO SERVICES, INC., San Antonio, TX (US)

(72) Inventor: William Malatak, San Antonio, TX (US)

(73) Assignee: VALERO SERVICES, INC., San Antonio, TX (US)

( * ) Notice: Subject to any disclaimer, the term of this patent is extended or adjusted under 35 U.S.C. 154(b) by 0 days.

(21) Appl. No.: 16/140,175

(22) Filed: Sep. 24, 2018

(65) Prior Publication Data

US 2019/0093027 A1 Mar. 28, 2019

Related U.S. Application Data

(60) Provisional application No. 62/563,577, filed on Sep. 26, 2017.

(51) Int. Cl.
*C10G 3/00* (2006.01)
*C10G 11/18* (2006.01)
(Continued)

(52) U.S. Cl.
CPC .............. *C10L 1/06* (2013.01); *C10G 3/50* (2013.01); *C10G 11/18* (2013.01); *C10G 69/04* (2013.01);
(Continued)

(58) Field of Classification Search
CPC .......... C10G 3/50; C10G 11/18; C10G 69/04; C10G 2300/1011; C10G 2300/1014; C10G 2300/1018
See application file for complete search history.

(56) References Cited

U.S. PATENT DOCUMENTS 2,208,362 A * 7/1940 Engel .................... C07C 5/2789
585/744
3,128,319 A 4/1964 Meisinger et al.
(Continued)

FOREIGN PATENT DOCUMENTS

CN 101326266 12/2008
CN 102712850 10/2012
(Continued)

OTHER PUBLICATIONS

International Search Report and Written Opinion Issued in Corresponding in PCT Patent Application No. PCT/US2018/052462, dated Nov. 30, 2018.
(Continued)

*Primary Examiner* — Michelle Stein
(74) *Attorney, Agent, or Firm* — Norton Rose Fulbright US LLP

(57) ABSTRACT

The present disclosure relates to methods for the production of transportation fuels from renewable plant- and animal-based resources. The methods disclosed herein present an environmentally-friendly process for using or recycling plant- and animal-based fats and oils. The renewable feed stocks can be used to produce a variety of hydrocarbon fuels, including renewable gasoline. The disclosure also relates to fuel products and fuel blend stocks produced from renewable hydrocarbon starting materials.

16 Claims, 2 Drawing Sheets

(51) Int. Cl.
*C10G 69/04* (2006.01)
*C10L 1/04* (2006.01)
*C10L 1/06* (2006.01)
*C10L 1/08* (2006.01)

(52) U.S. Cl.
CPC .................................. *C10L 1/04* (2013.01); *C10L 1/08* (2013.01); *C10G 2300/1007* (2013.01); *C10G 2300/1011* (2013.01); *C10G 2300/1014* (2013.01); *C10G 2300/1018* (2013.01); *C10G 2300/1081* (2013.01); *C10G 2300/308* (2013.01); *C10G 2400/02* (2013.01); *C10G 2400/04* (2013.01); *C10G 2400/08* (2013.01); *C10L 2200/0423* (2013.01); *C10L 2200/043* (2013.01); *C10L 2200/0446* (2013.01); *C10L 2200/0469* (2013.01); *C10L 2290/24* (2013.01)

(56) References Cited

U.S. PATENT DOCUMENTS

| | | | |
|---|---|---|---|
| 5,324,419 A * | 6/1994 | Muldowney | C10G 11/18 208/113 |
| 5,990,370 A * | 11/1999 | Sims | C07C 4/04 585/302 |
| 6,180,845 B1 * | 1/2001 | Catallo | C10B 53/02 585/242 |
| 7,550,634 B2 | 6/2009 | Yao et al. | |
| 7,955,401 B2 | 6/2011 | Ghonasgi et al. | |
| 7,999,143 B2 | 8/2011 | Marker et al. | |
| 8,119,847 B2 | 2/2012 | Dindi et al. | |
| 8,236,999 B2 | 8/2012 | Parimi et al. | |
| 8,247,632 B2 | 8/2012 | Strege et al. | |
| 8,283,506 B2 | 10/2012 | Kokayeff et al. | |
| 8,309,783 B2 | 11/2012 | Strege et al. | |
| 8,324,438 B2 | 12/2012 | Brandvold et al. | |
| 8,513,476 B2 | 8/2013 | Gomes et al. | |
| 8,530,715 B2 | 9/2013 | Strege et al. | |
| 8,815,198 B2 | 8/2014 | Aittamaa et al. | |
| 8,912,375 B2 | 12/2014 | Egeberg et al. | |
| 9,109,168 B2 | 8/2015 | Dupassieux et al. | |
| 9,617,479 B2 | 4/2017 | Fingland et al. | |
| 9,676,678 B1 | 6/2017 | Agee et al. | |
| 2007/0068848 A1 | 3/2007 | Monnier et al. | |
| 2009/0158637 A1 * | 6/2009 | McCall | C10G 45/02 44/308 |
| 2009/0250376 A1 * | 10/2009 | Brandvold | C10G 69/14 208/57 |
| 2009/0301930 A1 | 12/2009 | Brandvold et al. | |
| 2010/0065475 A1 * | 3/2010 | Gueret | C10G 3/50 422/139 |
| 2010/0069691 A1 | 3/2010 | Morschbacker | |
| 2012/0090223 A1 * | 4/2012 | Kokayeff | C10G 45/60 44/308 |
| 2012/0283491 A1 | 11/2012 | Zhou et al. | |
| 2013/0012746 A1 * | 1/2013 | Luebke | C10G 3/50 585/251 |
| 2013/0145683 A1 | 6/2013 | Freel et al. | |
| 2013/0165717 A1 * | 6/2013 | McCarthy | C10G 69/04 585/310 |
| 2013/0184505 A1 | 7/2013 | Ernest | |
| 2013/0245342 A1 | 9/2013 | Laumola et al. | |
| 2014/0109465 A1 | 4/2014 | Coppola et al. | |
| 2015/0065760 A1 | 3/2015 | Freel et al. | |
| 2015/0315502 A1 * | 11/2015 | Foody | C10G 2/32 518/703 |
| 2016/0032204 A1 | 2/2016 | Nousiainen et al. | |
| 2016/0130509 A1 * | 5/2016 | Nousiainen | C10G 45/44 585/324 |
| 2017/0002279 A1 | 1/2017 | Brown et al. | |
| 2017/0022424 A1 | 1/2017 | Chapus et al. | |
| 2017/0036975 A1 | 2/2017 | Ma et al. | |
| 2017/0037322 A1 | 2/2017 | Dutta et al. | |
| 2017/0065760 A1 | 3/2017 | Suffritti et al. | |

FOREIGN PATENT DOCUMENTS

| | | | | |
|---|---|---|---|---|
| CN | 103773496 | | 5/2014 | |
| WO | WO 2007/068798 | | 6/2007 | |
| WO | WO 2009/120242 | | 10/2009 | |
| WO | 2011053166 | | 5/2011 | |
| WO | WO-2011053166 A1 * | | 5/2011 | ............ C10G 1/002 |
| WO | WO 2012/092468 | | 7/2012 | |
| WO | WO 2014/064261 | | 5/2014 | |
| WO | WO 2015164088 | | 10/2015 | |
| WO | WO 2019/067610 | | 4/2019 | |

OTHER PUBLICATIONS

International Search Report and Written Opinion Issued in Corresponding in PCT Patent Application No. PCT/US2018/052948, dated Nov. 26, 2018.
Extended European Search Report issued in Corresponding European Application No. 18863367.1, dated May 14, 2021.
Extended European Search Report issued in Corresponding European Application No. 18862988.5, dated May 14, 2021.
Mercader et al., "Production of advanced biofuels: Co-processing of upgraded pyrolysis oil in standard refinery units" *Applied Catalysis B: Environmental* 2010, 96, 57-66.
Office Action issued in Corresponding Chinese Application No. 201880075068.2, dated Oct. 26, 2021 (English Translation provided).
Office Action issued in Corresponding Chinese Application No. 201880075143.5, dated Oct. 20, 2021 (English Translation provided).
Search Report issued in Corresponding Chinese Application No. 201880075068.2, dated Oct. 19, 2021 (English Translation provided).
Search Report issued in Corresponding Chinese Application No. 201880075143.5, dated Oct. 14, 2021 (English Translation provided).
Office Action issued in corresponding Eurasian Application No. 202090825 dated Oct. 7, 2022 (English translation).
Written Opinion and Search Report issued in corresponding Singapore Patent Application No. 10202202081Y dated Dec. 14, 2022.
Written Opinion and Search Report issued in corresponding Singapore Patent Application No. 10202202083U dated Dec. 14, 2022.
Unit 7, Lesson 2, "Lipids and Carbohydrates", 2011 filed with Response to Examination Report for corresponding European Patent Application No. 18863367.1.
Office Action issued in corresponding Brazilian Application No. BR11202005749-5, dated Mar. 2, 2023.
Office Action issued in corresponding Indonesian Patent Application No. P00202002445, dated Jul. 26.

* cited by examiner

PRODUCTION OF RENEWABLE FUELS AND INTERMEDIATES

CROSS REFERENCE TO RELATED APPLICATION

The present application claims priority to U.S. Provisional Application 62/563,577 filed Sep. 26, 2017, which is incorporated herein by reference.

FIELD OF THE INVENTION

This invention relates to the production of hydrocarbons from renewable plant and animal-based resources.

BACKGROUND

Biofuels that can be produced from renewable domestic resources offer an alternative to petroleum-based fuels. In order to encourage the production and consumption of biofuels in the United States, regulatory agencies have taken steps to mandate and incentivize increased production of fuels from renewable sources. California's Low Carbon Fuel Standard Program (LCFS) requires producers of petroleum-based fuels to reduce the carbon intensity of their products, beginning with a quarter of a percent in 2011, and culminating in a 10 percent total reduction in 2020. Petroleum importers, refiners, and wholesalers can either develop their own low carbon fuel products, or buy LCFS Credits from other companies that develop and sell low carbon alternative fuels.

Likewise, the United States Congress created the Renewable Fuel Standard (RFS) program to reduce greenhouse gas emissions and expand the nation's renewable fuels sector while reducing reliance on imported oil. This program was authorized under the Energy Policy Act of 2005, and the program was further expanded under the Energy Independence and Security Act of 2007. Being a national policy, the RFS program requires the replacement or reduction of a petroleum-based transportation fuel, heating oil, or jet fuel with a certain volume of renewable fuel. The four renewable fuel categories under the RFS program include biomass-based diesel, cellulosic biofuel, advanced biofuel, and total renewable fuel.

Current commercial production methods include esterification of triglycerides, fats, and fatty acids, transesterification of fatty esters, fermentation of sugar, catalytic upgrading of sugars, and biogas- and biomass-to-liquids methods. These methods have been primarily focused on the production of ethanol and biodiesel, and have not been very successful for producing large quantities of non-oxygenated renewable fuels. However, production of renewable hydrocarbons will help producers meet increasing environmental regulations and offer an attractive alternative for consumers that are interested in environmentally-friendly fuel alternatives which are replacements for non-renewable hydrocarbon components. Thus, there is a need in the industry for commercially feasible methods for the production of fuels from renewable sources.

SUMMARY

The present disclosure provides a method for producing a renewable hydrocarbon product from renewable fat and renewable oil feed stocks. The renewable fat and oil feed stocks are converted into a renewable paraffinic intermediate, which is then used to produce a renewable hydrocarbon product. The renewable hydrocarbon product may include a number of different fractions, including gasoline, diesel, and aviation fuel. Conditions for the production of the renewable hydrocarbon product may be adjusted to favor the production one fraction over others. For example, production conditions may be adjusted to favor the production of a renewable hydrocarbon product having a gasoline fraction as the major or primary constituent.

Some aspects of the present disclosure are directed to process for producing a renewable hydrocarbon fuel product comprising the steps of hydrotreating a renewable feed stock to produce a renewable paraffinic intermediate, optionally blending at least 1% by volume of the renewable paraffinic intermediate with an additional feed to produce a blend, and reacting the renewable paraffinic intermediate or the blend containing at least 1% by volume of the renewable paraffinic intermediate in a reaction zone under conditions sufficient to crack at least a portion of the renewable paraffinic intermediate or the blend to produce a renewable hydrocarbon fuel product. In some aspects, the reacting step comprises fluid catalytic cracking.

Some embodiments of the disclosure are directed to a renewable hydrocarbon fuel product having a $^{14}C$ isotopic ratio characteristic of a blend of petroleum and at least 1% by volume non-petroleum origin, and comprising less than about 5% coke. Some embodiments are directed to a blended renewable hydrocarbon product comprising a renewable hydrocarbon fuel product having a $^{14}C$ isotopic ratio characteristic of a blend of petroleum and at least 1% by volume non-petroleum origin, and comprising less than about 5% coke, and a second component comprising at least one of one or more petroleum fuel products and one or more renewable fuels.

Some aspects of the present disclosure are directed to a process for producing a renewable hydrocarbon fuel product comprising the steps of hydrotreating a renewable feed stock to produce a renewable paraffinic intermediate, blending at least 1% by volume of the renewable paraffinic intermediate with an additional feed to produce a blend, distilling the blend to produce at least one distilled fraction having at least 1% by volume of the renewable paraffinic intermediate, and reacting the at least one distilled fraction in a reaction zone under conditions sufficient to crack at least a portion of the at least one distilled fraction to produce a renewable hydrocarbon fuel product. In some aspects, the additional feed is a petroleum-based material. Examples of petroleum-based materials include but are not limited to crude oil and gas oil.

DETAILED DESCRIPTION

Figure 1:
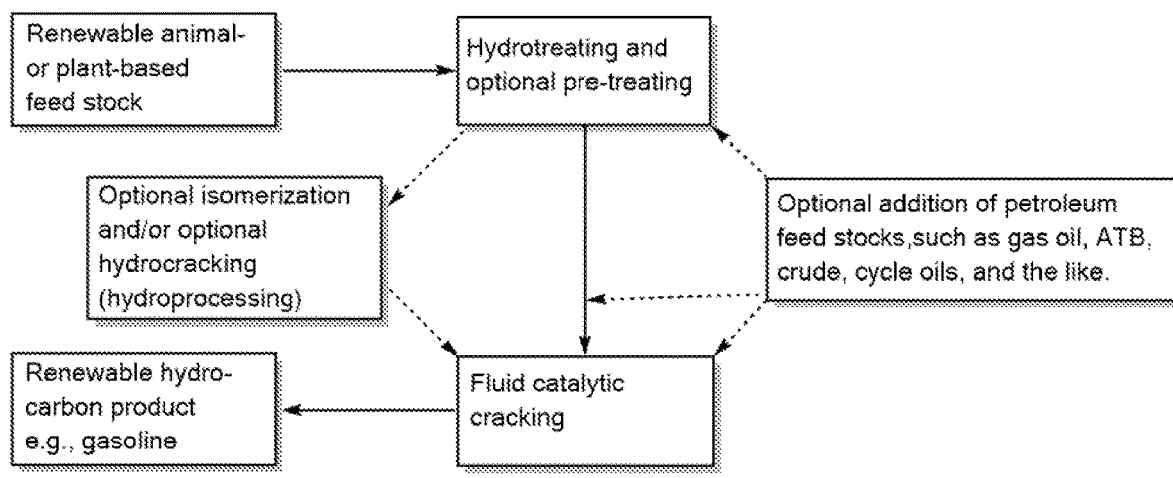
FIG. 1 is a flow diagram depicting the steps involved in the production of a renewable hydrocarbon product, e.g., renewable gasoline.
Figure 2:
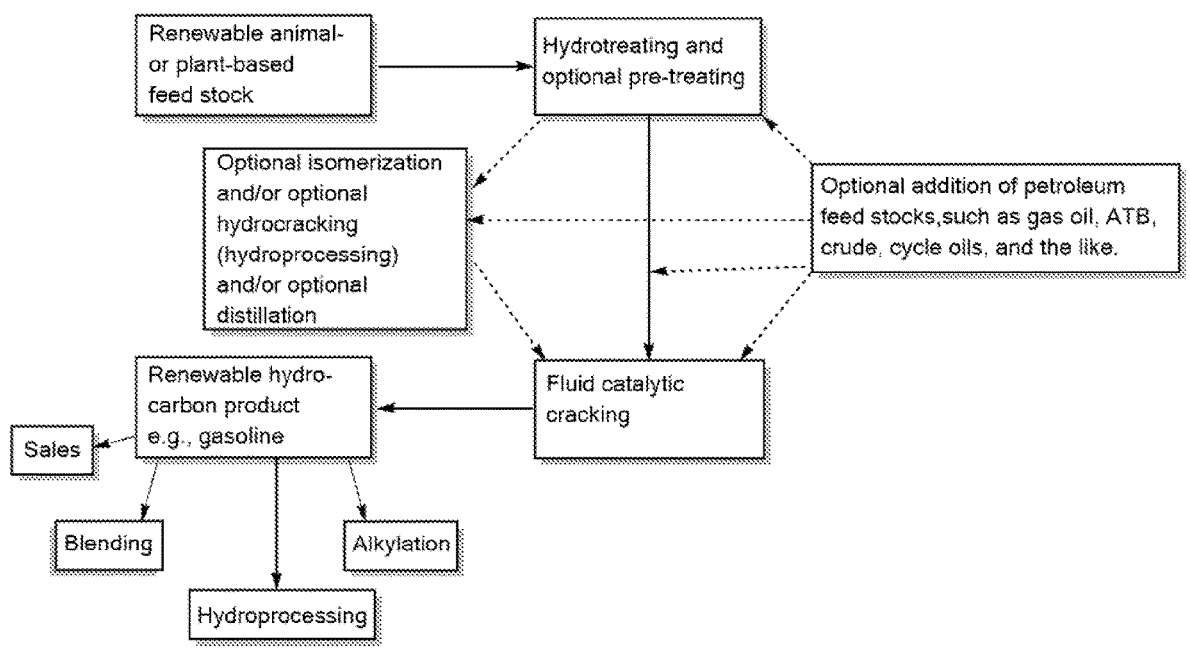
FIG. 2 is a flow diagram depicting steps involved in the production of a renewable hydrocarbon product, and potential uses of the renewable hydrocarbon product, including sales and further processing.

Various features and advantageous details are explained more fully with reference to the non-limiting embodiments that are illustrated in the accompanying drawing and detailed in the following description. It should be understood, however, that the detailed description and the specific examples, while indicating embodiments of the invention, are given by way of illustration only, and not by way of limitation. Various substitutions, modifications, additions, and/or rearrangements will become apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present disclosure provides a method for producing a renewable hydrocarbon fuel product from renewable fat and renewable oil feed stocks. The renewable fat and oil feed stocks are initially converted into a renewable paraffinic intermediate stream by a hydrotreating process. The renewable feed stock and/or renewable paraffinic intermediate can optionally be blended with other hydrocarbon streams, including crude oil, gas oil, fuel oils, diesel, and other petroleum distillates. The renewable paraffinic intermediate or blended intermediate is then processed in a cracking unit, for example, a fluid catalytic cracking unit, to produce the renewable hydrocarbon fuel product. The renewable fuel product may include a number of fractions, including, but not limited to, a fuel gas, ethylene, propylene, butylene, LPG, naphtha, gasoline, diesel, cycle oils, light cycle oil, and cat unit bottoms (slurry/decant oil). The renewable hydrocarbon fuel product may be further refined, for example, separated into constituent fractions and/or blended with other hydrocarbons, such as petroleum-based hydrocarbons or one or more renewable fuels, for example, ethanol, to produce a renewable hydrocarbon blended fuel product. The production process is flexible; the cracking conditions may be altered in order to favor the selective production of one or more fractions.

Generally, the renewable fats and renewable oils serving as original feed stocks are predominantly non-petroleum fats and oils. The renewable fats and renewable oils may originate from plant and animal sources. The fats and oils may include used cooking oil, recycled cooking oil, waste cooking oil, used vegetable oil, recycled vegetable oil, waste vegetable oil, rendered oils, animal fats, tallow, pork fat, chicken fat, fish oils, yellow grease, poultry fat, algal oils, algae-derived oils, soy oil, palm oil, palm fatty acids, plant-derived oils such as corn oil, canola oil, jatropha oil, olive oil, fatty acids, and seed oils, and the like. In one embodiment, the feed stock comprises at least 10% used cooking oil. In embodiments, the used stock comprises at least 10% used corn oil. In further embodiments, the feed stock comprises at least 10% used cooking oil and at least 10% used corn oil. The renewable fats and oils may be used alone, or may be used in combination. Low-quality grade fats and oils are customarily used for, or in some instances recycled into, animal feed stocks, personal care, and household products such as soap and detergent. The present disclosure provides a method for employing new and/or recycled renewable fats and oils as feed stocks for the production of renewable fuels such as gasoline, diesel, and aviation fuel, and chemical intermediates such as ethylene, propylene and butylene.

In some aspects, a process for producing a renewable hydrocarbon fuel product from a renewable feed stock is provided. A renewable hydrocarbon fuel product includes a renewable hydrocarbon that can be further refined and a renewable hydrocarbon blend stock that may be further processed to produce a sellable product. The process includes hydrotreating (and optionally isomerizing, dewaxing, and/or hydrocracking) the renewable feed stock to produce a renewable paraffinic intermediate, optionally blending the renewable paraffinic intermediate with an additional feed, and reacting at least a portion of the renewable paraffinic intermediate or blend in a reaction zone under conditions sufficient to crack at least a portion of the renewable paraffinic intermediate or blend to produce a product stream comprising a renewable or partially-renewable hydrocarbon fuel product. In some aspects, reacting at least a portion of the renewable paraffinic intermediate or blend in a reaction zone under conditions sufficient to crack at least a portion of the renewable paraffinic intermediate or blend comprises fluid catalytic cracking. The additional feed may comprise other hydrocarbon streams, such as a conventional petroleum-based intermediate to be cracked, including gas oil, distillates, atmospheric tower bottoms, cycle oils, and/or crude oil.

In some aspects, hydrotreating the renewable feed stock involves contacting the renewable feed stock with a catalyst in the presence of hydrogen at elevated temperature to produce a renewable paraffinic intermediate, which may be further hydro-processed or isomerized. Hydrotreating is understood to broadly refer to processes that treat a feed stock with hydrogen, and reactions that occur during hydrotreating include hydrodeoxygenation, hydrodesulfurization, hydrodenitrification, and saturation of olefins. The renewable feed stocks may comprise triglycerides and fatty acids (typically with chain lengths of C12-C24), anhydrides, esters, and combinations thereof. Esters may include mono-alcohol esters and polyol esters, such as triglycerides. The hydrotreating process may be a hydro-deoxygenation and hydrogenation process in which esters are cleaved, oxygenated compounds including acids and alcohols are reduced to the corresponding paraffins, and double bonds are saturated. Glycerin may be liberated during ester cleavage and hydrodeoxygenated to form propane. The renewable paraffinic intermediate may include, in addition to propane, butane. More specifically, some butane, for example, n-butane, is produced during the hydrotreating process and may be separated from the renewable paraffinic intermediate and fed to an isomerization unit where it is converted to isobutane. In some embodiments, double bonds are reduced during hydrotreating. In some aspects, the hydrotreating process reduces the level of contaminants, including, but not limited to, Na, Ca, Mg, K, P, S, N, Cl, Si, Mg, K, Al, and oxygenated compounds. The renewable feed stock may be blended with a petroleum feed prior to or during the hydrotreating step. The hydrotreating process may be performed at a pressure ranging from about 100 psig to about 3,400 psig, preferably at a pressure ranging from about 400 psig to about 1,800 psig. In some aspects, the hydrotreating process is carried out at a temperature ranging from about 250° C. to about 430° C. Catalysts for the hydrotreating process include, but are not limited to, Ni—Mo and Co—Mo catalysts. In some aspects, the hydrotreating process liquid hourly space velocity (LHSV) may range from about 0 to about 2.0 ($hr^{-1}$). A preferred hydrotreating reaction system includes at least one reactor, each of which has at least one or more catalyst beds. In some embodiments, the hydrotreating process is performed in a hydrotreating reactor having at least three beds.

In some aspects, the renewable feed stock is pre-treated prior to the hydrotreating step. Pre-treating may include one or more of a degumming step, a water-wash step, a demetallation step, a bleaching step, an ion-exchange step, a full (or partial) hydrogenation step, an acid gas removal step, and a water removal step. Degumming involves removal of gums and phosphorus compounds, such as phospholipids. Demetallation involves removal of metals, some of which may be harmful to the hydrotreating catalyst. In some aspects, the demetallation process produces a feed stock having a metal contaminant level of below 18 ppm. Acid gas removal includes removal of gases such as $CO_2$ and $H_2S$. Each of the pre-treating and hydrotreating steps may involve the use of one or more catalysts. The renewable feed stock may be blended with a petroleum feed prior to or during the pre-treating step.

The renewable paraffinic intermediate may be blended with a petroleum-based intermediate in an amount greater than 0% to less than 99% by volume of renewable paraffinic intermediate. These amounts may also range from greater than 0% to less than 80%, greater than 0% to less than 70%, greater than 0% to less than 60%, greater than 0% to less than 50%, greater than 0% to less than 40%, greater than 0% to less than 30%, greater than 0% to less than 20%, and greater than 0% to less than 10%, in each case by volume of renewable paraffinic intermediate. In some aspects, the renewable paraffinic intermediate is further reacted in a cracking unit essentially in the absence of a sulfur removal pre-treatment step prior to entry of the renewable paraffinic intermediate into the cracking unit.

In some embodiments, the renewable paraffinic intermediate or blend has a boiling point range from 180° C. to 400° C.; if co-processed with petroleum based feed stocks, the boiling point range may be increased beyond these levels. In some aspects, the renewable paraffinic intermediate, derived from triglycerides and fatty acids, and absent any co-processing, comprises greater than 90% paraffin compounds, and is substantially free of aromatic compounds; the renewable paraffinic intermediate may contain aromatic or naphthenic compounds if co-processed or blended with petroleum-based feed stocks or other known aromatic or naphthenic mixtures. Petroleum and other renewable feed stocks may be blended or added, either before, during or after, the pre-treatment and/or hydrotreating step. The renewable paraffinic intermediate or blend produced by the methods disclosed herein may have a lower cloud point and/or freezing point than a conventional, petroleum-based intermediate counterpart. In some aspects, the freezing point of the renewable paraffinic intermediate or blend may range from −50° C. to 50° C. In some aspects, the density of the renewable paraffinic intermediate or blend may range from 0.7 to 0.92 grams per cubic centimeter. The renewable paraffinic intermediate or blend may comprise 50 ppm or less, preferably 10 ppm or less, of Na, Ca, Mg, K, P, Mg, K, or other contaminants, providing no co-processing. In some embodiments, the renewable paraffinic intermediate or blend has an oxygen content of less than 11%. In particular instances, the renewable paraffinic intermediate has an oxygen content of less than 1%. In some aspects, the renewable paraffinic intermediate or blend is substantially free of fatty acids and/or fatty esters. The renewable paraffinic intermediate or blend may contain propane, resulting from hydrogenation of glycerin. In some embodiments, at least a portion of any propane resulting from triglyceride hydrotreating (i.e., hydrogenation of glycerin to propane), is separated from the renewable paraffinic intermediate, and is fed to a cracking unit where it is cracked into lighter products. In some aspects, the renewable paraffinic intermediate or blend has a $^{14}C$ isotopic ratio characteristic of non-petroleum origin for the paraffinic intermediate or, in the case of a blend, a $^{14}C$ isotopic ratio characteristic of a blend of petroleum and non-petroleum origins according to the percent by volume of each component. In some aspects, the renewable paraffinic intermediate or blend comprises at least 80% C8-C20 hydrocarbons, preferably at least 90% C8-C20 hydrocarbons, and more preferably at least 95% C8-C20 hydrocarbons. In some embodiments, the renewable paraffinic intermediate or blend is substantially free of aromatics and sulfur. In some aspects, the renewable paraffinic intermediate or blend has a pour point in the range of −18° C. to 50° C. In some embodiments, the renewable paraffinic intermediate or blend has a flash point greater than 20° C. In further embodiments, the renewable paraffinic intermediate or blend has a California Air Resource Board Certified LCFS carbon intensity value less than 55, as defined at https://www.arb.ca.gov/fuels/lcfs/fuelpathways/pathwaytable.htm.

Optionally, the renewable intermediate stream may be further processed to reduce the pour point of the intermediate prior to routing to the cracking unit. This may include commonly known refining steps such as dewaxing, isomerization, and/or hydrocracking. Alternatively the renewable intermediate may be blended with other petroleum or renewable based materials in order to lower the pour point of the mixture prior to routing to an FCC unit. Lowering the pour point to the range of −18° C. to 50° C. will aid in reducing gelling or solidification that may otherwise occur prior to cracking in an FCC unit.

In some aspects, conditions sufficient to crack at least a portion of the renewable paraffinic intermediate or blend comprise reacting the intermediate or blend in a cracking unit, such as a fluid catalytic cracking unit or hydrocracking unit. In some aspects, conditions sufficient to crack at least a portion of the renewable paraffinic intermediate or blend comprise contacting the renewable paraffinic intermediate or blend with a fluid catalytic cracking catalyst in a fluid catalytic cracking reactor at elevated temperature and pressure. In some aspects, the temperature may range from 400° C. to 800° C. In other embodiments, the temperature may range from about 475° C. to about 600° C., preferably from about 490° C. to about 600° C., and more preferably from about 500° C. to about 550° C. In some embodiments, the pressure may range from greater than 0 to 80 psig. In other embodiments, the pressure may range from about 5 to about 80 psig, preferably from about 10 to about 55 psig. The catalyst may be an aluminosilicate catalyst, such as a zeolite catalyst, or other catalyst commonly used in a fluidized cracking reactor. In some embodiments, a catalyst to oil feed ratio may range from about 2:1 to about 20:1 by weight, preferably from about 4:1 to about 10:1. In some aspects, a reactor stripping steam/catalyst ratio may range from about 0.5 to about 6 pounds steam/1,000 pounds catalyst, preferably about 2 pounds steam/1,000 pounds catalyst. In some embodiments, the composition has a catalyst-to-feed stock ratio ranging from 2:1 to 10:1 by weight, and the renewable paraffinic intermediate or blend fed to the reactor has an oxygen content of less than 11% and is substantially free of fatty acids and/or fatty esters. In some embodiments, the amount of the composition is greater than 100 kilograms.

In a specific embodiment, cracking of the renewable paraffinic intermediate is performed in a fluidized bed reactor with a catalyst made up of finely divided or particulate solid material. In a particular aspect, cracking of the renewable paraffinic intermediate is performed in a fluid catalytic cracking unit (FCC). In a fluid catalytic cracking unit, the catalyst is suspended in a reaction zone by passing liquid, gas, and/or vapor through the catalyst particles. The renewable paraffinic intermediate comes into contact with the fluidized catalyst particles which catalyze the cracking reaction. The cracking conditions (temperature, pressure, catalyst to oil ratio) may be adjusted such that the cracking process (yield, conversion, selectivity, etc.) meets the requirements of production. During the cracking process, coke (solid carbonaceous material) becomes deposited on the catalyst particles. The catalyst particles are partially deactivated by the deposition of coke and may be transferred to a stripping zone for removing adsorbed hydrocarbons and gases from catalyst. The stripped catalyst particles are transferred to a regeneration zone for oxidative coke removal by using air or oxygen-enriched air. The regenerated catalyst particles may then be reintroduced into the reaction zone for continued cracking catalysis. The cracking process may involve cyclically repeating the cracking and catalyst regeneration steps to continuously produce the renewable hydrocarbon fuel product. In a specific embodiment, the process is run continuously for at least 1 month, preferably for at least 6 months. In various embodiments, the reacting or cracking step produces renewable hydrocarbon fuel product in an amount of at least 100 liters per day.

Referring now to FIG. 1, a flow diagram is depicted with an embodiment of the steps involved in the production of a renewable hydrocarbon fuel product, which may be further refined or further blended to produce a renewable blended product or partially renewable blended product, for example, renewable gasoline. In this embodiment, a renewable animal or plant-based feed stock, such as fat, undergoes hydrotreatment, i.e., cleavage of triglycerides and decarboxylation of fatty acids under reductive hydrogenation conditions. Additional components added at the hydrotreating stage may include diesel or gas oil. The feed stock may optionally undergo pre-treatment prior to hydrotreatment to improve the hydrotreatment process. The intermediate from hydrotreating may optionally undergo pre-treatment, or cracker unit feed hydrotreating, including blending with other hydrocarbon components, such as gas oil or ATB's (atmospheric tower bottoms). The resulting intermediate is transported to a fluid catalytic cracking unit and reacted with a cracking catalyst under appropriate cracking conditions to yield a renewable hydrocarbon fuel product with properties similar to petroleum-derived components.

Some aspects of the disclosure are directed towards a hydrocarbon fuel product in industrially relevant amounts by cracking, preferably fluid catalytic cracking (FCC), of a renewable intermediate feed stock as described herein, wherein the renewable intermediate feed stock can be processed in the cracking unit essentially by itself, or co-processed as a blend with an additional feed stock stream. In such cases, the product from the cracking unit is a renewable hydrocarbon fuel product produced in an industrially relevant amount by the process as described herein. By industrially relevant amounts is meant amounts that enter the consumer market rather than laboratory scale amounts. In one example, industrially relevant amounts are produced continuously at greater than 100 liters renewable hydrocarbon fuel product per day for a time period of at least one month.

In some aspects, the renewable hydrocarbon fuel product has a $^{14}C$ isotopic ratio characteristic of a blend of petroleum and non-petroleum origins with at least 1% by volume of non-petroleum origins, i.e., derived from the renewable intermediate feed stock. In some aspects of the invention, the renewable hydrocarbon fuel product comprises less than about 5% coke. In some embodiments, the renewable hydrocarbon fuel product has a boiling point ranging from 180° C. to 400° C. In some aspects, the renewable hydrocarbon fuel product has a specific gravity between about 0.55 and about 0.92, preferably between about 0.72 and about 0.92. In some embodiments, the renewable hydrocarbon fuel product has a cloud point between about −20° C. and about 50° C. In some aspects, the renewable hydrocarbon fuel product has an isoparaffin to normal paraffin ratio of about 0.0 to about 9.0. An isoparaffin to normal paraffin ratio of 0.0 corresponds to a renewable hydrocarbon fuel product having essentially no isoparaffin. The renewable hydrocarbon fuel product may have less than 20 ppm of Na, Ca, Mg, K, P, Mg, K, or other contaminants. In some aspects, the renewable hydrocarbon fuel product has less than 10 ppm of Na, Ca, Mg, K, P, Mg, K, or other contaminants. In some aspects, the renewable hydrocarbon fuel product may have a sulfur content less than about 0.2 weight % of a total weight of the renewable hydrocarbon fuel product. In some aspects, the freezing point of the renewable hydrocarbon fuel product may range from −50° C. to 50° C. In particular aspects, the freezing point of the renewable hydrocarbon fuel product may range from −20° C. to 40° C.

The renewable hydrocarbon fuel product may have a lower cloud point and/or freezing point than a conventional, petroleum-based blend stock counterpart. In some aspects, the renewable hydrocarbon fuel product may be used as a blend stock and combined with one or more petroleum fuel products and/or renewable fuels. Upon blending with other products, the blending of materials will change the properties of the renewable hydrocarbon fuel product or blend stock. Examples of renewable fuels include but are not limited ethanol, propanol, and butanol. Petroleum-based streams include, but are not limited to gasoline, diesel, aviation fuel, or other hydrocarbon streams obtained by refining of petroleum. The amount of petroleum-based stream blended with the renewable hydrocarbon fuel product may be greater than 0% to less than 99% by volume of renewable hydrocarbon fuel product. These amounts may also range from greater than 0% to less than 80%, greater than 0% to less than 70%, greater than 0% to less than 60%, greater than 0% to less than 50%, greater than 0% to less than 40%, greater than 0% to less than 30%, greater than 0% to less than 20%, and greater than 0% to less than 10%, in each case by volume of renewable hydrocarbon fuel product. In particular aspects, the renewable hydrocarbon fuel product is blended to produce a product selected from gasoline, aviation fuel, light cycle oil, and diesel. The renewable hydrocarbon fuel product or the blended product used to produce gasoline or aviation fuel may have an octane rating ranging from 40 to 110, preferably from 50 to 98. In particular aspects, the octane rating may range from 80 to 95. The octane rating is defined as the number average of research octane number (RON) and motor octane number (MON). Some aspects of the disclosure are directed to gasoline comprising at least 1% by volume of the renewable hydrocarbon fuel product produced in an industrially relevant amount. Some aspects of the disclosure are directed to aviation fuel comprising at least 1% by volume of the renewable hydrocarbon fuel product produced in an industrially relevant amount. Some aspects of the disclosure are directed to light cycle oil comprising at least 1% by volume of the renewable hydrocarbon fuel product produced in an industrially relevant amount.

The renewable hydrocarbon fuel product may be sold or further processed. Examples of further processing include blending, hydroprocessing, or alkylating at least a portion of the renewable hydrocarbon fuel product. The renewable hydrocarbon fuel product may be separated into two or more constituent streams. Constituent streams include but are not limited to a fuel gas stream, an ethylene stream, a propylene stream, a butylene stream, an LPG stream, a naphtha stream, an olefin stream, a diesel stream, a gasoline stream, a light cycle oil stream, an aviation fuel stream, a cat unit bottoms (slurry/decant oil) stream, and other hydrocarbon streams. In some aspects, a constituent stream may be further processed. In specific embodiments, an olefinic constituent stream may be sent to an alkylation unit and/or a dimersol unit for further processing. In addition, olefins from the constituent streams may be further separated and recovered for use in renewable plastics and petrochemicals.

In various embodiments, the renewable paraffinic intermediate described herein, or the renewable hydrocarbon fuel product described herein, or both, may be used in existing infrastructure for petroleum-based equivalents without the need for modification of existing physical units including pipelines, holding units, and reactors.

A "glyceride" is an ester of glycerol and at least carboxylic acid. Glycerides include mono-, di-, and triglycerides. The terms "a" and "an" are defined as one or more unless this disclosure explicitly requires otherwise. The term "substantially" is defined as being largely but not necessarily wholly what is specified (and include wholly what is specified) as understood by one of ordinary skill in the art. In any disclosed embodiment, the term "substantially" may be substituted with "within [a percentage] of" what is specified, where the percentage includes 0.1, 1, 5, and 10 percent. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a catalyst composition that "comprises," "has," "includes" or "contains" one or more elements possesses those one or more elements, but is not limited to possessing only those one or more elements. Likewise, an element of a system or composition that "comprises," "has," "includes" or "contains" one or more features possesses those one or more features, but is not limited to possessing only those one or more features.

The feature or features of one embodiment may be applied to other embodiments, even though not described or illustrated, unless expressly prohibited by this disclosure or the nature of the embodiments. Any embodiment of any of the disclosed composition, system, or process can consist of or consist essentially of, rather than comprise/include/contain/have, any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb. Details associated with the embodiments described above and others are presented below.

EXAMPLES

Example 1—Renewable Intermediate Feed Stock Produced by Hydrotreating

In a hydrotreating process, 100 bbl of a renewable triglyceride react with 1,800 scf/bbl of hydrogen to produce 106 bbl of a mixture of hydrocarbons. In an exemplary hydrotreating process, 100 bbl of a renewable triglyceride will produce 106 bbl of hydrocarbons with a specific gravity of approximately 0.78 and small amounts of light gases. The hydrotreating process produces more hydrocarbons per unit volume of starting triglyceride, and does not require an additional methanol source. Oxygen-containing compounds are largely converted into the corresponding hydrocarbons, water, CO, and $CO_2$.

Example 2—Characterization and Comparison of Renewable Fcc Products

Cracking a petroleum-based feed in an FCC yields a higher amount of coke as compared with a renewable intermediate feed. The coke produced (wt %) during cracking of a petroleum-based feed is greater than 6 wt %. By contrast, cracking a renewable intermediate feed yields approximately 2.2 wt % coke. As a result of the reduced coke production, the renewable intermediate can be fed to the cracking unit at a higher rate, the cracking unit can be operated at more severe reaction conditions, and the catalyst to oil ratio can be increased, which would result in increased product conversion.

TABLE 1

Petroleum-Based vs. Renewable Intermediate FCC Yields

| Petroleum-Based FCC Yields | | Renewable Intermediate FCC Yields | |
| --- | --- | --- | --- |
| | Liquid Volume % | | Liquid Volume % |
| LPG | 33.4 | LPG | 39.2 |
| Gasoline | 47.1 | Gasoline | 40.4 |
| LCO | 21.8 | LCO | 35.4 |
| Slurry | 6.0 | Slurry | 1.4 |
| Coke, wt % | 6.3 | Coke, wt % | 2.2 |
| Total | 108.3 | Total | 116.4 |

Implementation of the renewable hydrocarbon production methods disclosed herein presents an economically viable, environmentally friendly approach to supplement current petroleum-based fuel production methods. The methods disclosed herein demonstrate desirable process conditions, and allow for the acquisition of valuable environmental regulation credits to use and sell.

The claims are not to be interpreted as including means-plus- or step-plus-function limitations, unless such a limitation is explicitly recited in a given claim using the phrase(s) "means for" or "step for," respectively.

The invention claimed is:

1. A process for producing a renewable hydrocarbon fuel product, the process comprising:
    hydrotreating used cooking oil to produce a renewable paraffinic intermediate comprising at least 80% C8-C20 hydrocarbons and substantially free of aromatics;
    reacting said renewable paraffinic intermediate in a fluid catalytic cracking reactor at a temperature ranging from 400° C. to 550° C., and a catalyst to renewable paraffinic intermediate feed ratio from 4:1 to 10:1 to produce a renewable hydrocarbon fuel product comprising less than 5% coke;
    wherein said renewable paraffinic intermediate comprises 0% to 10% by volume of a petroleum feed,
    wherein said renewable paraffinic intermediate being fed to the reaction zone has not isomerized; and
    wherein the used cooking oil is pre-treated prior to hydrotreating, and wherein pre-treatment consists of degumming and bleaching.

2. The process of claim 1, further comprising the step of blending said renewable feed stock with a petroleum feed stock prior to or during said pre-treating step to produce a blend, wherein said blend comprises up to 10% by volume of the petroleum feed stock.

3. The process of claim 1, further comprising the step of blending said renewable feed stock with a petroleum feed stock prior to or during said hydrotreating step to produce a blend, wherein said blend comprises up to 10% by volume of the petroleum feed stock.

4. The process of claim 1, wherein conditions sufficient to crack at least a portion of said renewable paraffinic intermediate in said fluid catalytic cracking reactor comprise a reactor pressure ranging from greater than 0 to 80 psig.

5. The process of claim 1, further comprising the step of blending said renewable paraffinic intermediate with a petroleum-based feed to produce a renewable paraffinic intermediate blend, wherein said blend comprises up to 10% by volume of the petroleum-based feed.

6. The process of claim 1, further comprising the step of blending said renewable hydrocarbon fuel product with a petroleum fuel product and/or with one or more renewable fuels.

7. The process of claim 1, further comprising the step of separating said renewable hydrocarbon fuel product into two or more constituent streams.

8. The process of claim 7, wherein said two or more constituent streams comprise at least two of a fuel gas stream, an ethylene stream, a propylene stream, a butylene stream, an LPG stream, a naphtha stream, an olefin stream, a diesel stream, a gasoline stream, a light cycle oil stream, a jet fuel stream, and a cat unit bottoms (slurry/decant oil) stream.

9. The process of claim 8, wherein at least one constituent stream is an olefin stream, and further comprising the step of feeding said olefin stream to an alkylation unit and/or a dimersol unit.

10. The process of claim 1, wherein said renewable paraffinic intermediate comprises propane.

11. The process of claim 10, further comprising the step of separating said propane from said renewable paraffinic intermediate and feeding said separated propane to a cracking unit.

12. The process of claim 1, wherein said renewable paraffinic intermediate comprises n-butane.

13. The process of claim 12, further comprising the step of separating said n-butane from said renewable paraffinic intermediate, and isomerizing said n-butane into isobutane.

14. The process of claim 1, wherein said reacting step is performed in the absence of a sulfur removal pre-treatment step of said renewable paraffinic intermediate.

15. The process of claim 5, further comprising:
distilling said renewable paraffinic intermediate blend to produce at least one distilled fraction having at least 1% by volume of said renewable paraffinic intermediate; and
reacting said at least one distilled fraction in the reaction zone under conditions sufficient to crack at least a portion of said at least one distilled fraction to produce a renewable hydrocarbon fuel product.

16. The process of claim 1, wherein said renewable paraffinic intermediate feed comprises 0% by volume of the petroleum feed.

* * * * *